United States Patent
Wissing et al.

(10) Patent No.: US 9,375,026 B2
(45) Date of Patent: Jun. 28, 2016

(54) NUTRIENT COMPOSITION FOR BIOLOGICAL SYSTEMS

(71) Applicant: CHEMISCHE FABRIK BUDENHEIM KG, Budenheim (DE)

(72) Inventors: Albertus Wissing, Liederbach am Taunus (DE); Gunnar Bühler, Nickenich (DE); Christian Graf, Mainz (DE); Kilian Schwarz, Mainz (DE); Michael Rapphahn, Eschborn (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 14/364,128

(22) PCT Filed: Dec. 21, 2012

(86) PCT No.: PCT/EP2012/076734
§ 371 (c)(1),
(2) Date: Jun. 10, 2014

(87) PCT Pub. No.: WO2013/093042
PCT Pub. Date: Jun. 27, 2013

(65) Prior Publication Data
US 2014/0360240 A1 Dec. 11, 2014

(30) Foreign Application Priority Data
Dec. 21, 2011 (DE) .......................... 10 2011 056 815

(51) Int. Cl.
| | |
|---|---|
| *C01B 25/45* | (2006.01) |
| *C05B 17/00* | (2006.01) |
| *A23K 1/175* | (2006.01) |
| *A23L 1/304* | (2006.01) |
| *C01B 25/37* | (2006.01) |
| *C01B 25/38* | (2006.01) |
| *C05B 17/02* | (2006.01) |
| *C05D 9/02* | (2006.01) |

(52) U.S. Cl.
CPC .............. *A23K 1/1758* (2013.01); *A23K 1/1751* (2013.01); *A23K 1/1753* (2013.01); *A23K 1/1755* (2013.01); *A23L 1/304* (2013.01); *A23L 1/3045* (2013.01); *C01B 25/375* (2013.01); *C01B 25/377* (2013.01); *C01B 25/38* (2013.01); *C01B 25/45* (2013.01); *C05B 17/00* (2013.01); *C05B 17/02* (2013.01); *C05D 9/02* (2013.01); *A23V 2002/00* (2013.01); *C01P 2002/01* (2013.01); *C01P 2002/72* (2013.01)

(58) Field of Classification Search
None
See application file for complete search history.

(56) References Cited

U.S. PATENT DOCUMENTS

| | | | | | |
|---|---|---|---|---|---|
| 2,031,579 | A | * | 2/1936 | Booth | 423/51 |
| 2,414,974 | A | * | 1/1947 | Nielsen | 423/311 |
| 3,897,236 | A | * | 7/1975 | Roberts | 71/1 |
| 4,346,065 | A | * | 8/1982 | Maurer et al. | 423/305 |
| 6,350,474 | B1 | | 2/2002 | Dzneladze et al. | |
| 6,645,452 | B1 | * | 11/2003 | Barker et al. | 423/306 |
| 7,691,171 | B2 | * | 4/2010 | Varadachari | C05B 13/00 423/306 |
| 8,574,518 | B2 | | 11/2013 | Buehler et al. | |
| 8,858,702 | B2 | * | 10/2014 | Wagh et al. | 106/690 |
| 8,999,031 | B2 | * | 4/2015 | Varadachari | C05B 13/06 423/138 |
| 2010/0240533 | A1 | | 9/2010 | Varadachari | |
| 2011/0117415 | A1 | * | 5/2011 | Saka et al. | 429/144 |
| 2013/0129634 | A1 | * | 5/2013 | Tampieri et al. | 424/9.36 |

FOREIGN PATENT DOCUMENTS

| | | |
|---|---|---|
| CN | 1226136 A | 8/1999 |
| DE | 10 2009 001 204 A1 | 9/2010 |
| WO | WO-02/099913 A1 | 12/2002 |
| WO | WO-2009/030796 A2 | 3/2009 |
| WO | 2010/097341 * | 9/2010 |

OTHER PUBLICATIONS

T. G. Ammari et al., "Management of Iron Deficiency Stress in Citrus through Soil Application of Vivianite to a Calcareous Soil", International Journal of Botany 5, 2009, vol. 2, pp. 186-189.
L. L. Barton et al., "Iron Nutrition in Plants and Rhizospheric Microorganisms", www.springer.com.
L. N. Degtyarenko et al., "Synthesis of Manganese Cobalt Phosphate Dihydrates", Russian Journal of Inorganic Chemistry, vol. 42, No. 1, 1997, pp. 29-31.
I. Diaz et al., Vivianite (ferrous phosphate) alleviates iron chlorosis in grapevine, Vitus, 2009, vol. 48, No. 3, pp. 107-113.
A. Eynard et al., "Use of vivianite ($Fe_3(PO_4)_2.8H_2O$) to prevent iron chlorosis in calcareous soils", Fertilizer Research, vol. 31, 1992, pp. 61-67).
Chinese Office Action dated Jun. 24, 2015 issued in corresponding Chinese Patent Application No. 201280063550.7 (and its English translation) (18 pages).

* cited by examiner

*Primary Examiner* — Wayne Langel
(74) *Attorney, Agent, or Firm* — Drinker Biddle & Reath LLP (57) ABSTRACT

A nutrient composition for biological systems, such as humans, animals, plants or microorganisms includes at least one monometallic or mixed-metallic phosphate of the (M1 M2 M3 ... Mx)$_3$(PO$_4$)$_2$.aH$_2$O type where 0≤a≤9, where (M1, M2, M3 ... Mx) represent the one metal of the monometallic phosphate or the two or more metals of the mixed-metallic phosphate and are selected from Na, K, Mg, Ca, Cr, Mo, W, Mn, Fe, Co, Ni, Cu, Zn and B, with the proviso that at least one of the metals in the phosphate is selected from Mn, Fe, Co and Ni.

19 Claims, 6 Drawing Sheets

Figure 1: Powder x-ray diffraction diagram of the product from Example 8 with CuK$_\alpha$ radiation Figure 2: Transmission electron microscopy photograph (TEM) of individual platelet-shaped crystals of the product from Example 8

Figure 3: Electron diffraction images from TEM studies on individual platelet-shaped crystals of the product from Example 8

Figure 4: Electron microscopy photograph of the product from Example 1

Figure 5: Electron microscopy photograph of the product from Example 3

Figure 6: Electron microscopy photograph of the product from Example 6

Figure 7: Powder x-ray diffraction diagram of the product from Example 5 with CuK$_\alpha$ radiation, fully indexed to PDF 75-1186 (Fe$_3$(PO$_4$)$_2$ x 8 H$_2$O) and 41-0375 (Co$_3$(PO$_4$)$_2$ x 8 H$_2$O)

Figure 8: Powder x-ray diffraction diagram of the product from Example 4 with CuK$_\alpha$ radiation, fully indexed to PDF 75-1186 (Fe$_3$(PO$_4$)$_2$ × 8 H$_2$O) and 46-1388 (Ni$_3$(PO$_4$)$_2$ × 8 H$_2$O)

NUTRIENT COMPOSITION FOR BIOLOGICAL SYSTEMS

CROSS REFERENCE TO RELATED APPLICATIONS

This application is a National Stage of International Application No. PCT/EP2012/076734 filed Dec. 21, 2012, which claims benefit of German Patent Application No. 10 2011 056 815.8 filed Dec. 21, 2011, both of which are herein incorporated by reference in their entirety.

SUBJECT MATTER OF THE INVENTION

The invention relates to a nutrient composition for biological systems, such as humans, animals, plants and microorganisms.

BACKGROUND OF THE INVENTION

Biological systems, such as humans, animals, plants and microorganisms, require inorganic elements (trace elements, macroelements) and minerals for physiological processes and for the synthesis of active substances. The nutrient sources available for such biological systems provide necessary elements and minerals in very different amounts and chemical modifications. It may therefore be necessary to make available to biological systems additional nutrients with inorganic elements and minerals in suitable quantities and in utilizable forms.

According to various studies, more than 30 trace elements are regarded as essential for vital processes. The trace elements include a large proportion of metals, such as e.g. iron, copper, manganese and zinc, but also some non-metals, such as e.g. iodine, selenium, bromine and fluorine.

Trace elements which are absent from the diet of humans, animals, plants and microorganisms can lead to deficiency symptoms, toxic actions or reduced yield, for example in microbial processes, such as biofermentation, or in plant and animal production.

Essential factors for the availability of nutrients are, in addition to the uptake capacity of a biological system, inter alia the quantities or concentrations offered to the biological system and the forms in which the nutrients are provided to the biological system. The latter forms of nutrients include not only the compounds themselves in which the nutrients are present, but often also the ambient conditions under which the nutrients are offered to the biological system, for example the pH.

The availability of nutrients in the soil to plants is influenced by various factors. Thus, for example, the trace elements B, Cu and Zn have an optimum availability to plants at a pH in the soil of between 5 and 7, whereas Fe and Mn have a better availability at a pH of below 6, but Ca and Mg at a pH above 6.5. The availability of the transition metals in soils to plants can be limited significantly by the formation of various complexes. Oxides and oxyhydroxides of Fe, Zn, Cu and Mn play an important role in the solubility of these elements in the soil, the prevailing redox potential of the particular soil structure playing a decisive role.

There are several examples of biochemistry in which metallic trace elements in specific functions and in particular unique metal combinations transform enormous masses in the biosphere. For example, a combination of manganese and magnesium and their stoichiometric ratio play an important role in photosynthesis processes. The ionic ratios of molybdenum and magnesium or copper and magnesium play an important role in substrate oxidation and subsequent energy storage in digestion processes.

Although iron is one of the most frequently occurring elements in the soil, the quantities available to plants are limited in many soils. Iron from most primary soil minerals is present in the divalent Fe(II) form, but is oxidized by weathering processes under aerobic conditions and is fixed as Fe(III) oxide. Although Fe(III) is present in soils in considerably larger quantities, Fe(II) is of greater importance in plant physiology, since it is by far the more preferred form of uptake. Fe(II) from conventional fertilizers also oxidizes rapidly and often precipitates in the soil matrix in unused form. Known fertilizers comprise iron in the form of iron sulphate, iron ammonium sulphate, iron ammonium citrate, iron gluconate, iron ligninsulphonates or also in chelated form. Iron sulphate, for example, has an iron content of about 20%, is relatively inexpensive as a fertilizer and can be applied as soil application or as leaf application. However, iron sulphate applied by soil application is often ineffective because of rapidly occurring precipitation reactions to give Fe(III), in particular at soil pH values above 7.

Leaf application of trace elements can be improved by surface-active agents, which have an effect on the distribution and uptake of the nutrients. Surface-active agents which are employed are plant oils, rape methyl ester, protein derivatives, ionic and nonionic wetting agents, organosilicones, polymers, waxes etc. They act as wetting agents for an improved wetting of the leaf surface, as penetration agents to facilitate uptake of the nutrients into the plant or as adhesives for improving the adhesion of the nutrients to the leaf surface.

Iron sulphate and iron chelates with DTPA or EDTA are employed via leaf application to eliminate or prevent chloroses, but with varying results. While iron sulphate is the less expensive compound, the more expensive iron chelates often show a better action because the iron is present in stabilized form and furthermore can also be taken up directly by the leaf. Attempts to improve the uptake of iron via a leaf application include formulation of the iron sulphate together with citrate or the direct use of iron lignosulphonates and Fe(III) salts under acid formulation conditions.

Iron chelates applied to the soil are water-soluble and easily washed out of the root zone of the plants in the event of intensive irrigation or during the period of low vegetation in autumn and winter. A possibly underestimated problem of some synthetic chelates is the potential bonding capacity of heavy metals with a subsequently increased washing out. Some iron chelates presumably have an adverse effect on microorganisms and mycorrhizae present in the soil.

To improve the efficacy of less expensive iron fertilizer forms, such as, for example, iron sulphate, so-called controlled-release fertilizers (CRF) having a defined slow release of nutrients have been proposed. Other approaches relate to a band application of iron sulphate with hydrophilic polyacrylamide gels, with iron fertilizer granules enveloped in sulphur or the immobilization of iron chelates in Sepharose gel. Various naturally occurring crystalline iron compounds, such as vivianite ($Fe_3(PO_4)_2 \cdot 8H_2O$) and pyrites ($FeS_2$), show a higher effectiveness than $FeSO_4$, but are less available and therefore more expensive.

The preparation of synthetic vivianite is described as relatively favourable and simple, in that iron sulphate heptahydrate and mono- or diammonium phosphate are simultaneously dissolved in water directly on site by the end user. The product is an initially white suspension which, however, rapidly assumes a greenish-blue colour, which is characteristic of partially oxidized vivianite. In order to prevent the vivianite particles, which have a size of about 2-10 µm, from settling on the base of the preparation container, the suspension must be stirred continuously and employed as quickly as possible.

Many references to synergistic effects of various nutrient elements on plants, in particular with simultaneous application in the vicinity of the rhizosphere, are known to the person skilled in the art. For example, ammonium, sulphate or potassium are said to increase the availability of iron in lime-containing soils significantly due to the physiological acidification of the rhizosphere.

An adequate supply of trace elements to agricultural and horticultural crops is of decisive importance to the nutrition of humans and animals. Research is focussed on the concentrations of iron and zinc in plant foodstuffs, such as cereals and rice, and the bioavailability thereof. It is known that the trace element concentrations in cereals in particular differ significantly and can be increased by known measures.

Nutrient additives for animal nutrition are said to improve the quality of the feed and the health and output of the animals. Animals kept agriculturally meet the majority of their trace elements requirement via the plant food offered to them. The presence of important trace elements in vegetative plant parts and plant seeds is therefore of the greatest importance for animal nutrition.

As in plant nutrition, in animal nutrition there are also known antagonistic interactions between trace elements in the organism. One of the certainly best-researched interactions concerns the antagonistic relationship of the trace elements copper, molybdenum and sulphur. An excess of sulphur, molybdenum and iron in the diet is said to impair the uptake and utilization of copper. This leads to deficiency symptoms, even in the case of adequate copper concentrations in the diet. There is therefore the need to coordinate animal nutrition with respect to the concentration ratios of the trace nutrients.

The provision of nutrient substances in a suitable composition is also of decisive importance for the microorganisms employed in industrial microbiological (biotechnology) processes in order to optimize the productivity of the particular system.

The fermentation, i.e. the breakdown metabolism of organic matter by microorganisms under either aerobic or anaerobic conditions, delivers diverse end products. In this context, in addition to essential further process parameters, such as temperature, pH etc., the optimum nutrient composition of the medium is of decisive importance for success. Depending on the use, the important nutrients can also include essential trace elements, such as Cu, Co, Fe, Mn, Mo or Zn.

OBJECT

The object of the present invention was to provide a nutrient composition for biological systems, such as humans, animals, plants and microorganisms, which is improved with respect to the prior art.

DESCRIPTION OF THE INVENTION

The object of the invention is achieved by a nutrient composition which comprises at least one monometallic or mixed metallic phosphate of the type $(M1\ M2\ M3\ \ldots\ Mx)_3(PO_4)_2 \cdot aH_2O$, where $0 \leq a \leq 9$, wherein $(M1, M2, M3 \ldots Mx)$ represent the one metal of the monometallic or the several metals of the mixed metallic phosphate and are selected from Na, K, Mg, Ca, Cr, Mo, W, Mn, Fe, Co, Ni, Cu, Zn and B, with the proviso that at least one of the metals in the phosphate is selected from Mn, Fe, Co and Ni, wherein the at least one phosphate can be prepared or is prepared by a) preparing an aqueous solution (I) which comprises at least one or more of the metals Mn, Fe, Co and/or Ni as divalent cations by introducing oxidic metal(II), metal(III) and/or metal(IV) compounds or mixtures or compounds thereof having mixed oxidation states, selected from hydroxides, oxides, oxide hydroxides, oxide hydrates, carbonates and hydroxide carbonates, of at least one of the metals Mn, Fe, Co and/or Ni together with the elemental forms or alloys of at least one of the metals Mn, Fe, Co and/or Ni into an aqueous medium comprising phosphoric acid and reacting the oxidic metal compounds with the elemental forms or alloys of the metals (in a redox reaction) to give the divalent metal ions, b) separating off any solids present from the phosphoric acid aqueous solution (I), c) if the phosphate is a mixed metallic phosphate and, in addition to the metals introduced into the solution in stage a), comprises further metals selected from (M1, M2, M3 ... Mx), furthermore adding to the aqueous solution (I) at least one compound of at least one of the metals (M1, M2, M3 ... Mx) in the form of an aqueous solution or as a solid in the form of a salt, the at least one compound preferably being selected from hydroxides, oxides, oxide hydroxides, oxide hydrates, carbonates, hydroxide carbonates, carboxylates, sulphates, chlorides or nitrates of the metals, d) providing an initial charge solution (II) having a pH of from 5 to 8 prepared from an aqueous phosphoric acid solution by neutralization with an aqueous alkali metal hydroxide solution or prepared from an aqueous solution of one or more alkali metal phosphates, e) metering the aqueous solution (I) into the initial charge solution (II) and simultaneously metering in a basic aqueous alkali metal hydroxide solution such that the pH of the reaction mixture obtained is kept in the range of from 5 to 8, preferably 6 to 7, the phosphate of the type $(M1\ M2\ M3\ \ldots\ M_x)_3(PO_4)_2 \cdot aH_2O$ being precipitated, f) separating off from the reaction solution the phosphate which has precipitated.

This nutrient composition, which comprises at least one monometallic or mixed metallic phosphate of the type $(M1\ M2\ M3\ \ldots\ Mx)_3(PO_4)_2 \cdot aH_2O$, where $0 \leq a \leq 9$, is hereinafter also called "variant A" of the nutrient composition according to the invention.

A monometallic phosphate in the context of the present invention is a phosphate of the type $M_3(PO_4)_2 \cdot aH_2O$, where $0 \leq a \leq 9$, wherein M is a metal selected from Mn, Fe, Co and Ni. In the case of a monometallic phosphate, the formula style $(M1\ M2\ M3\ \ldots\ Mx)$ thus represents a single metal M.

A mixed metallic phosphate in the context of the present invention is a phosphate of the type $(M1M2\ M3\ \ldots\ Mx)_3(PO_4)_2 \cdot aH_2O$, where $0 \leq a \leq 9$, wherein the formula style $(M1M2\ M3\ \ldots\ Mx)$ represents two or more different metals, at least one of which is selected from Mn, Fe, Co and Ni. The other metal or metals can be selected from Na, K, Mg, Ca, Cr, Mo, W, Mn, Fe, Co, Ni, Cu, Zn and B, excluding the metal or metals already selected from Mn, Fe, Co and Ni.

The object of the invention is furthermore achieved by a nutrient composition which comprises an aqueous solution (I) which comprises cations of a single metal or of various metals (M1, M2, M3 ... Mx), wherein i) the metal in an aqueous solution comprising only a single metal is selected from Mn, Co and Ni and ii) the metals (M1, M2, M3 ... Mx) in an aqueous solution comprising various metals are selected from Na, K, Mg, Ca, Cr, Mo, W, Mn, Fe, Co, Ni, Cu, Zn and B, with the proviso that at least one of the metals is selected from Mn, Fe, Co and Ni, wherein the aqueous solution (I) can be prepared or is prepared by introducing oxidic metal(II), metal(III) and/or metal(IV) compounds or mixtures or compounds thereof having mixed oxidation states, selected from hydroxides, oxides, oxide hydroxides, oxide hydrates, carbonates and hydroxide carbonates, of at least one of the metals Mn, Fe, Co and/or Ni together with the elemental forms or alloys of at least one of the metals Mn, Fe, Co and/or Ni into an aqueous medium comprising phosphoric acid and reacting the oxidic metal compounds with the elemental forms or alloys of the metals (in a redox reaction) to give the divalent metal ions, and optionally adding to the aqueous solution (I) at least one compound of at least one of the metals M1, M2, M3 . . . Mx in the form of an aqueous solution or as a solid in the form of a salt, the at least one compound preferably being selected from hydroxides, oxides, oxide hydroxides, oxide hydrates, carbonates, hydroxide carbonates, carboxylates, sulphates, chlorides or nitrates of the metals.

This nutrient composition, which comprises an aqueous solution (I) which comprises cations of a single metal or of various metals (M1, M2, M3 . . . Mx), is hereinafter also called "variant B" of the nutrient composition according to the invention.

In a preferred embodiment of the nutrient composition according to variant B, solution (I) comprises at least 2 different metals (M1 M2 M3 . . . Mx) and preferably not more than 10 different metals (M1 M2 M3 . . . Mx).

The metals Mn, Fe, Co and/or Ni introduced into solution (I) during the preparation of a nutrient composition according to the invention according to variants A and B are herein also called "main metals". The metals furthermore optionally introduced into solution (I) selected from Na, K, Mg, Ca, Cr, Mo, W, Mn, Fe, Co, Ni, Cu, Zn and B are herein also called "doping metals". The doping metals can be present in the solution in the form of the divalent metal ions, but they can also be present in the solution in the form of the trivalent or tetravalent metal ions.

The preparation of the product according to the invention is simple and inexpensive. The particular advantage lies in that fact that the aqueous phosphoric acid solution (I) prepared in a first reaction stage comprises only the desired metal cations and phosphate anions or phosphoric acid and no or no substantial amounts of non-phosphate ions, such as sulphates, nitrates or chlorides, which are often undesirable. If doping metals are introduced in the form of sulphates, nitrates or chlorides, which lies in the scope of the invention, this is conventionally carried out in very small amounts which do not substantially impair the purity of the product. The product according to the invention is therefore distinguished by a high purity, as a result of which it is best suitable as a nutrient by itself or in complex nutrient mixtures.

The invention provides an extremely flexible reaction principle with which a large number of phosphate systems of the type described herein can be prepared, for example (pseudo) binary, (pseudo)ternary and (pseudo)quaternary systems.

The preparation described herein for the monometallic or mixed metallic phosphate according to variant A of the invention offers the possibility, by suitable choice of the precipitation conditions, such as pH, concentrations, temperature etc., of controlling certain material parameters, such as crystal phase and cation distribution, morphology, crystallite and secondary particle size and the chemical purity of the products obtained. In this context, products having a fine platelet-shaped morphology which have a uniform crystal phase and an isotropic distribution of the cations are particularly desirable. The fine platelet-shaped morphology allows a fine dispersion and furthermore offers the largest possible surface area in order to provide the nutrients to biological systems.

In many industrial but also biological systems, the product morphology is of critical importance for successful use. For illustration, the importance and the prior art with respect to the preparation of a synthetic vivianite for use as a fertilizer have already been described above. The processes used according to the prior art for the preparation of a synthetic Fe(II) phosphate $Fe_3(PO_4)_2 \cdot 8H_2O$ (analogously to the mineral vivianite) lead to product properties which have a relatively coarse particle morphology. In contrast, a very fine platelet-shaped morphology can be achieved according to the invention, which leads to an improved availability in particular of the $Fe^{2+}$ ions primarily present. The product according to the invention thus offers improved properties with respect to the prior art for avoiding and eliminating nutrient deficiency symptoms.

In the preparation of the product according to the invention according to variants A and B, in a first reaction stage the oxidic metal(II), metal(III) and/or metal (IV) compounds are reacted with elemental metal or alloys in a phosphoric acid aqueous medium in a redox reaction to give the divalent metal ions. The course of the redox reaction described between the elemental metals and the oxidic components depends on their particular specific surface areas, since the electron transfer takes place at the interface. The formation of hydrogen gas must be considered as a side reaction competing with transfer of electrons from the elemental metal forms to the oxidic metal forms. In this context, electron transfer from the elemental metal forms to protons to form free radicals which form hydrogen gas by combination of free radicals occurs. The particle sizes of the elemental and oxidic metal forms employed should therefore be coordinated to one another in order to suppress the side reaction and to draw the greatest possible benefit from the dissolving of the inexpensive oxidic metal form. Generally, the finer the elemental metal form, the more the side reaction is promoted if the oxidic form does not offer a surface of sufficiently high activity.

Depending on the composition of the reaction solution, unreacted components can remain in the solution as solid residues. If solids are still present in the resulting reaction solution, these are preferably separated off from the phosphoric acid aqueous solution during the preparation of the nutrient composition according to variant A. Solids can be separated off by all suitable known methods for separation of liquids and solids, for example filtration, centrifugation, sedimentation etc.

If the product to be prepared according to the invention according to variants A and B is to comprise, in addition to the metals introduced into solution (I) in the first reaction stage (redox reaction), further metals selected from (M1, M2, M3 . . . Mx), after the first reaction stage (redox reaction) at least one compound of at least one of the metals (M1, M2, M3 . . . Mx is added to the aqueous solution in the form of an aqueous solution or as a solid in the form of a salt, the at least one compound preferably being selected from hydroxides, oxides, oxide hydroxides, oxide hydrates, carbonates, hydroxide carbonates, carboxylates, sulphates, chlorides or nitrates of the metals. The addition of these metals is expediently carried out after any solids present have been separated off from the phosphoric acid aqueous solution (I). Alternatively, the addition of the metals which has been described can also be carried out directly after the preparation of solution (I) in the first reaction stage (redox reaction) and before the separating off of any solids present. The separating off of any solids present is then carried out after the addition of the doping metals. For certain uses, separating off of solids present may not be necessary. The separating off is then not carried out. Such a variant is also included in the present invention.

By addition of suitable metal salts (doping metals) in the form mentioned, the desired metal content or the ratio of the metals relative to one another in the product to be prepared can be established very accurately. This applies above all to metals which are employed in a relatively small amount. Metal compounds which introduce no interfering anions into the mixture should expediently be introduced, in order to ensure the highest degree of purity of the product. Such metal compounds are, in particular, hydroxides, oxides, oxide hydroxides, oxide hydrates, carbonates and hydroxide carbonates which react or dissociate under the prevailing acid conditions to form water. If necessary, buffers familiar to the person skilled in the art can be employed in order to prevent an undesirable premature or uncontrolled precipitation. Carboxylates may likewise be suitable if the contents of organic acids remaining in the mixture do not interfere or are not decomposed or degraded later. The addition of the metals in the form of their sulphates, chlorides or nitrates may likewise be suitable for doping metals if the content of sulphates, chlorides or nitrates in the product does not thereby exceed certain limit values which are still regarded as acceptable for the particular use.

The initial charge solution (II) for the subsequent precipitation of the phosphates which is used in the preparation described above for the monometallic or mixed metallic phosphate of the nutrient composition according to variant A is likewise a phosphate solution having a pH buffered in the range of from 5 to 8. The initial charge solution is prepared either from an aqueous phosphoric acid solution by neutralization with an aqueous alkali metal hydroxide solution or directly from an aqueous solution of one or more alkali metal phosphates. For the precipitation of the phosphates according to the invention, the aqueous solution (I) is metered into the initial charge solution (II). Due to the low pH of the phosphoric acid solution (I), in this procedure a basic aqueous alkali metal hydroxide solution is simultaneously metered in, in order to keep the pH of the reaction mixture obtained in the range of from 5 to 8. Too low a pH of the initial charge solution (II) or of the resulting reaction mixture below a pH of 5 has the disadvantage that in addition to the desired crystal phase according to the invention, further crystal phases may also form, e.g. metal hydrogen or metal dihydrogen phosphates. Too high a pH of the initial charge solution (II) above a pH of 8 has the disadvantage that traces of metal hydroxides may form, which are an undesirable contamination in the products according to the invention, and which are not very soluble and therefore poorly available as a nutrient. Preferably, the basic aqueous alkali metal hydroxide solution is metered in such that during metering in of solution (I) a pH in the range of from 6 to 7 is established in the reaction mixture. This has the advantage that exclusively the crystal phase according to the invention forms.

After the precipitation of the phosphate according to the invention, this is separated off from the reaction solution. This is again also carried out by processes known per se, for example filtration, centrifugation, sedimentation etc. The phosphate which has been separated off from the reaction solution is then expediently dried, i.e. dewatered. The drying can optionally be carried out under the ambient atmosphere, under an inert gas atmosphere and/or under reduced pressure and/or at elevated temperature (above room temperature, 25° C.). The processes suitable for this are familiar to the person skilled in the art in the field and require no more detailed description. Reference is additionally made to the following examples. During the drying, free water is removed from the residue which has been separated off from the reaction solution. Depending on the desired product, however, bonded water of crystallization is also removed by the drying, down to a desired hydrate level of the product. Preferably, the product is dried down to a hydrate level (M1 M2 M3 ... Mx)$_3$ (PO$_4$)$_2$.aH$_2$O, where $0 \leq a \leq 8$, particularly preferably down to a hydrate level (M1 M2 M3 ... Mx)$_3$(PO$_4$)$_2$.aH$_2$O, where $0 \leq a \leq 3$. Drying down to a hydrate level where $0 \leq a \leq 3$ has the advantage over higher hydrate levels that this is a hydrate level which is stable over a wide temperature range and there are therefore no problems during the later handling of the products according to the invention.

In a particularly preferred embodiment of the nutrient composition according to variant A of the invention, the phosphate is a mixed metallic phosphate which comprises at least 2 different metals (M1 M2 M3 ... Mx). In the preparation of mixed metallic phosphates, the invention has considerable advantages over the prior art with respect to the efficiency, the process costs, the energy consumption and the product purity which can be achieved. Furthermore, the contents of the various metals in the mixed metallic phosphate can be established very easily and accurately. By suitable choice of the precipitation conditions, such as pH, concentrations, temperature etc., the process according to the invention furthermore allows certain material parameters, such as crystal phase and cation distribution, morphology, crystallite and secondary particle size and the chemical purity of the products obtained, to be controlled. In the known processes in which phosphates and other metal salts are mixed and precipitated, this is not possible in such a simple manner or is possible to only a limited extent. Furthermore, alternative preparation methods require a higher outlay on washing and are therefore as a rule accompanied by a substantially higher outlay on energy and resources.

The mixed metallic phosphate can theoretically comprise any desired number of different metals within the selection stated herein. Preferably, however, the mixed metallic phosphate comprises not more than 10 different metals (M1 M2 M3 ... Mx), particularly preferably not more than 6 different metals. In most cases, a mixed metallic phosphate of the type according to the invention having two, three or four different metals is expediently prepared. It is often desirable to prepare a mixed metallic phosphate which comprises one or two different metals in high contents as so-called main metals and one or more metals each in low contents as so-called doping metals or dopings. For example, a phosphate according to the invention comprising manganese or iron as the main metal can advantageously comprise a low content of a further metal, for example Mg, Zn or Cu.

In biological systems, such as plants or microorganisms, the provision of the nutrient composition is of decisive importance for maintaining the vital functions and optimum growth. The importance of the quantitative and relative composition of the essential trace elements has already been described above for the fields of use of plant and animal nutrition and for industrial microbiology. The advantage of the nutrient composition according to the invention consists of the possibility of combining mixed metallic phosphates theoretically with any desired number of different metals within the choice defined herein. Furthermore, doping metals can be bonded into the product in a targeted manner. The outlay on analysis in the precise preparation of complex nutrient mixtures is reduced significantly, since the essential components are present in a defined compound. The products according to the invention render possible the optimally coordinated combination and subsequent analysis of various elements in order to meet the requirements of plant and animal nutrition and of industrial microbiology. The nutrient composition according to the invention can comprise a single monometallic or mixed metallic phosphate, but it can also comprise a mixture of two or more monometallic and/or mixed metallic phosphates, as a result of which the nutrient composition can be adapted still further to the requirements of the particular biological system. A nutrient composition of the type according to the invention can thus also be compiled as according to a modular system from several monometallic and/or mixed metallic base phosphates in order to meet the requirements of the particular biological system.

In a further preferred embodiment of the nutrient composition according to the invention according to variant A, the precipitation of the phosphate in stage e) is carried out at a temperature in the range of from 5 to 105° C. In this procedure the temperature can be kept constant in the region of +/−5° C. around the desired point by a suitable regulator unit. Higher temperatures in general lead to a more pronounced crystallinity or accelerate the growth of the crystallites of the products. The precipitation of the phosphate is particularly preferably carried out at a temperature in the range of from 10 to 40° C., as a result of which, in favour of the economy and ecology of the process, in general there is no need to heat and/or cool:

In a further preferred embodiment of the nutrient composition according to the invention according to variant A, before the metering into the initial charge solution (II) a surface-active substance, such as wetting agent, penetration agent or adhesive (plant oils, rape methyl ester, protein derivatives, ionic and nonionic wetting agents, organosilicones, polymers, waxes and the like) or active agents, such as formulation auxiliaries (surfactants, emulsifiers, thickening agents, defoamers or the like), synthetic and organic chelates or sequestrating products, acidifying agents, phosphite, plant protection agents (including safeners thereof), inhibitors, vitamins, which improve the quality and efficacy of the products according to the invention in later use and extend the potential field of use, are dispersed in the aqueous solution (I).

To increase the dispersion stability of the nutrient composition according to the invention according to variant A in a liquid phase, it may be advantageous to finely distribute the product according to the invention in the liquid phase by the action of mechanical forces. In addition to known methods for introduction of high shearing forces, the use of stirred ball mills are suitable in particular for this. By using a stirred ball mill, in addition to the fine distribution of the products according to the invention the average particle size or agglomerate size thereof can also be modified. Thus e.g. the average particle size can be reduced to <500 nm. The specific surface area (according to the BET method) in this context can be between 2-90 $m^2/g$, preferably 30-60 $m^2/g$. The dispersions obtained are very stable and even after several days have scarcely any tendency towards sedimentation of the solid. It is known to the person skilled in the art that the stability of the dispersion can advantageously be improved by the addition of surface-active substances.

In a further preferred embodiment of the nutrient composition according to variant A, the phosphate is precipitated as described, but is not subsequently isolated. Rather, a molar excess of phosphoric acid preferably prevailing in the solution is used in order to add to the reaction solution, after the precipitation, further cations in the form of alkali metal hydroxide, alkaline earth metal hydroxide or ammonia, with the formation of ammonium ions, until the reaction solution has a conductivity minimum. It may be expedient to add to the solution potassium hydroxide for neutralization, since potassium is an essential growth factor for plants. The resulting mixture, comprising the solid of the phosphate according to the invention, phosphate anions, potassium cations and/or ammonium cations, is then dewatered at elevated temperature and/or under reduced pressure, as a result of which a product which, in addition to the nutrients according to the invention, additionally comprises potassium and/or ammonium available to plants in the form of phosphates is formed.

In a further preferred embodiment of the nutrient composition according to variant A, the initial charge solution (II) comprises the phosphate ions, calculated as $P_2O_5$, in a concentration in the range of from 0.35 to 1.85 mol/l. A phosphate ion concentration below 0.35 mol/l of $P_2O_5$ has the disadvantage that the reaction mixture is unnecessarily diluted and in the case of a commercial use an unnecessarily large volume of filtrate would have to be treated. A phosphate ion concentration above 1.85 mol/l of $P_2O_5$ has the disadvantage that due to a high solids content and resulting high viscosity, the reaction mixture cannot be mixed thoroughly in an optimum manner. As a result, this may lead to local concentration gradients, which can have an adverse effect on the formation of the desired crystal phase.

The nutrient composition according to the invention according to variants A and B can furthermore comprise constituents having an acid action (acidifying agents), which the composition releases together with the nutrients present in a time-dependent, quantitatively controlled manner. The action of ammonium-containing nitrogen fertilizers and of elemental sulphur on the pH of agriculturally cultivated soils or plant soil is known. The nutrient composition according to the invention offers the possibility of co-integrating acidifying agents of various types, such as elemental sulphur or oxidized forms thereof, for example sulphate, into the product according to the invention. By intentional acidifying effects in the soil, in particular in the rhizosphere region of plants, the product according to the invention has potentially improved properties compared with nutrient compositions according to the prior art in avoiding and eliminating nutrient deficiency, for example in highly lime-containing and alkaline soils. Furthermore, the products according to the invention per se have an acid character, i.e. aqueous dispersions of the products according to the invention show an acid pH in the range of from 2 to 5.

The concentration of the phosphoric acid in the aqueous solution (I) prepared during the preparation of the nutrient composition according to the invention according to variants A and B is expediently 5% to 85%, preferably 10% to 40%, particularly preferably 15% to 30%, very particularly preferably 20% to 25%, based on the weight of the aqueous solution (I).

In a further preferred embodiment of the invention according to variants A and B, the reaction of the oxidic metal compounds with the elemental forms or alloys of the metals in solution (I) is carried out at a temperature in the range of from 5° C. to 105° C., preferably in the range of from 10° C. to 75° C., particularly preferably in the range of from 20° C. to 50° C.

It is furthermore advantageous to carry out the reaction of the oxidic metal compounds with the elemental forms or alloys of the metals in solution (I) according to variants A and B with intensive thorough mixing, in order to achieve a uniform reaction and to avoid local excess concentrations within the reaction solution.

The reaction of the oxidic metal compounds with the elemental forms or alloys of the metals in solution (I) according to variants A and B is expediently carried out for a period of time of from 1 min to 240 min, preferably from 5 min to 120 min, particularly preferably from 30 min to 90 min. The required duration of the reaction for a sufficiently complete reaction depends on the reactants and the reaction conditions and can be easily determined by the person skilled in the art by a few simple experiments. In the case of too short a duration of the reaction, the reaction as a rule will not be sufficiently complete and will deliver too large an amount of unreacted starting substances. However, the reaction time should not be too long, since the process is then less economical. A complete reaction is furthermore advantageous in order to obtain a defined composition of the metals. As described, additional improvement can optionally be achieved by addition of suitable metal salts, which nevertheless makes the process unnecessarily more expensive or increases the risk of an unacceptable anion contamination.

In a further embodiment of the invention, the nutrient composition according to variants A and B comprises one or more surface-active substances (surfactants) in an amount of from 0.05 to 10 wt. %, preferably 1.5 to 5 wt. %, particularly preferably 1.8 to 4 wt. %, based on the weight of the nutrient composition. The advantages of this embodiment are described herein above. The surface-active substances can be added directly to the reaction mixture, for example solution (I) or the mixture obtained after the precipitation of the phosphates. Alternatively, the surface-active substances can also be added to the filter cake which has been isolated, before its drying, or to the product after the drying, by mixing, spraying on or in a granulation process.

Particularly preferably, the mixed metallic phosphate comprising manganese (Mn) comprises, based on all the metals present, at least 40 at. % of Mn, preferably at least 60 at. % of Mn, particularly preferably at least 80 at. % of Mn, very particularly preferably at least 90 at. % of Mn.

In a further embodiment of the nutrient composition according to variant A, the at least one monometallic or mixed metallic phosphate comprises manganese (Mn) and, in the powder x-ray diffraction diagram, has peaks at $10.96\pm0.05$, $12.78\pm0.17$, $14.96\pm0.13$, $17.34\pm0.15$, $18.98\pm0.18$, $21.75\pm0.21$, $22.07\pm0.11$, $22.97\pm0.10$, $25.93\pm0.25$, $26.95\pm0.30$, $27.56\pm0.10$, $29.19\pm0.12$, $29.84\pm0.21$, $30.27\pm0.12$, $34.86\pm0.21$, $35.00\pm0.20$, $35.33\pm0.30$, $35.58\pm0.10$, $35.73\pm0.12$, $42.79\pm0.45$, $43.37\pm0.45$, $44.70\pm0.15$ and $44.93\pm0.20$ degree two-theta, based on $CuK\alpha$ radiation.

Such a structure, which has not hitherto been described by powder x-ray diffraction data, of a monometallic or mixed metallic phosphate according to the invention can be achieved if the phosphate comprises, based on all the metals present, at least 40 at. % of Mn, preferably at least 60 at. % of Mn, particularly preferably at least 80 at. % of Mn, very particularly preferably at least 90 at. % of Mn or only manganese (Mn) as the metal, in addition to process-related impurities. This phosphate preferably has an orthorhombic unit cell having lattice parameters of $13.2\pm0.2$, $8.6\pm0.2$ and $8.1\pm0.2$ Ångström.

The invention also includes the use of a monometallic or mixed metallic phosphate of the type $(M1\ M2\ M3\ \ldots\ Mx)_3(PO_4)_2 \cdot aH_2O$, where $0 \leq a \leq 9$, as is defined herein according to variant A, or use of an aqueous solution (I) which comprises cations of a single metal or of various metals (M1, M2, M3 ... Mx) as defined herein according to variant B for the preparation of a nutrient composition for biological systems, such as humans, animals, plants and microorganisms.

The product according to the invention can be employed as a nutrient in all fields of plant nutrition, for example in agriculture and in horticulture, for supplying nutrients in cereals, root crops, fruit, vegetables, ornamental plants, lawns, green areas, energy plants etc. the product according to the invention can be used as a solid or liquid by itself or as a constituent of formulations, for example in the form of coatings on granulated fertilizer forms, in so-called controlled-release formulations (CRF) and slow-release formulations (SRF) or in so-called condensed fertilizer forms. The product according to the invention can be used in particular in the field of irrigation of crop plants (fertigation), which includes, for example, systems of drip irrigation, or microirrigation or hydroponics. The product can be employed in soil application and in leaf application. The product can furthermore be employed in the field of seed treatment, in the synthesis of fertilizer products, e.g. polymeric structures on an ammonium phosphate basis or phosphate-silicate frits, for admixing or integrating uptake of pesticides, herbicides, so-called safeners thereof and biological plant protection and nutritional agents.

The product according to the invention can also be employed as a nutrient in all fields of nutrition of humans and animals, for example for biofortification, for nutrient supplementation of foodstuffs and feedstuffs for agricultural stock animals, sport or domestic animals and for needs- and age-associated meeting of nutrient requirement and therefore for ensuring the health and performance of humans and animals.

The product according to the invention can furthermore be employed as a nutrient in industrial microbiology, for example in biopolymer production, in microbiological foodstuffs production, in nutrient and culture media for cells and microorganisms, in fermentation, in microbiological cleaning, in waste treatment and in the microbiological preparation of products in the health sector.

The use of the phosphates according to the invention in a nutrient composition has the advantage over the use of known nutrients that the various desired metal cations are already present in the ideal isotropically distributed form in a highly pure compound which can be characterized unambiguously with respect to its crystal phase, composition and morphology with simple and known methods. The finely divided platelet form of the primary crystallites ensures in this context the largest possible active surface and lowest possible diffusion zones and diffusion times for the provision of the nutrients.

A further advantage consists of the absence of relatively large amounts of undesirable anionic impurities, such as, for example, sulphates, nitrates, chlorides, carbonates and carboxylates, which has a positive effect in particular in the administration of the nutrients to organisms which may react adversely to these anions or which refuse intake of nutrients due to an influencing of the taste by such impurities. In contrast, phosphates have a neutral taste compared with the anions mentioned.

EXAMPLES

Example 1

A phosphoric acid solution (I) was prepared from 80 g of 75% strength $H_3PO_4$ and 160 g of deionized water. 14.3 g of $Mn_3O_4$ and 3.5 g of Fe were added to this solution (I). Solution (I) was stirred at room temperature for 90 minutes and then filtered in order to remove any remaining residues from the solution.

A basic solution of 40 g of NaOH and 1,000 g of deionized water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 120° C. in a circulating air drying cabinet.

Example 2

A phosphoric acid solution (I) was prepared from 230 g of 75% strength $H_3PO_4$ and 460 g of deionized water. 8.9 g of $MnO_2$ as well as 30.1 g of $Mn_3O_4$ and 13.1 g of Fe were added to this solution (I). Solution (I) was stirred at room temperature for 60 minutes and then filtered in order to remove any remaining residues from the solution.

A basic solution of 120 g of NaOH and 3,000 g of deionized water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 90° C. in a circulating air drying cabinet.

Example 3

A phosphoric acid solution (I) was prepared from 80 g of 75% strength $H_3PO_4$ and 160 g of deionized water. 14.3 g of $Mn_3O_4$ and 3.8 g of Co were added to this solution (I). Solution (I) was stirred at 60° C. for 60 minutes and then filtered in order to remove any remaining residues from the solution.

A basic solution of 40.4 g of NaOH and 229 g of water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 70° C. in a circulating air drying cabinet.

Example 4

A phosphoric acid solution (I) was prepared from 80 g of 75% strength $H_3PO_4$ and 160 g of deionized water. 14.1 g of $Fe_3O_4$ and 3.5 g of Fe were added to this solution (I). Solution (I) was stirred at 60° C. for 60 minutes and 33.1 g of $NiSO_4.6H_2O$, dissolved in 100 g of water, were then added. The resulting solution was filtered in order to remove any remaining residues.

A basic solution of 50 g of NaOH and 500 g of water was furthermore prepared. 10 g of $H_3PO_4$ with 100 g of water were then initially introduced into a reaction vessel and neutralized to a pH of 7 with the basic solution to give the initial charge solution (H). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 100° C. in a circulating air drying cabinet.

Example 5

A phosphoric acid solution (I) was prepared from 80 g of 75% strength $H_3PO_4$ and 160 g of deionized water. 14.1 g of $Fe_3O_4$ and 3.8 g of Co were added to this solution (I). Solution (I) was stirred at 60° C. for 60 minutes and then filtered in order to remove any remaining residues from the solution.

A basic solution of 50 g of NaOH and 500 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 70° C. in a circulating air drying cabinet.

Example 6

A phosphoric acid solution (I) was prepared from 80 g of 75% strength $H_3PO_4$ and 160 g of deionized water. 14.4 g of $Co_3O_4$ and 3.8 g of Co were added to this solution (I). Solution (I) was stirred at room temperature for 60 minutes and then filtered in order to remove any remaining residues from the solution.

A basic solution of 41.9 g of NaOH and 376.8 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 7

A phosphoric acid solution (I) was prepared from 80 g of 75% strength $H_3PO_4$ and 160 g of deionized water. 14.1 g of $Fe_3O_4$ and 3.5 g of Fe were added to this solution (I). Solution (I) was stirred at 60° C. for 60 minutes and then filtered in order to remove any remaining residues from the solution.

A basic solution of 17.6 g of NaOH and 158.7 g of water was furthermore prepared. 10 g of $H_3PO_4$ with 100 g of water were then initially introduced into a reaction vessel and neutralized to a pH of 7 with the basic solution to give the initial charge solution (II). 100 g of the phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 8

A phosphoric acid solution (I) was prepared from 80 g of 75% strength $H_3PO_4$ and 160 g of deionized water. 14.1 g of $Mn_3O_4$ and 4.5 g of Mn were added to this solution (I). Solution (I) was stirred at 20° C. for 90 minutes and then filtered in order to remove any remaining residues from the solution.

A basic solution of 17.6 g of NaOH and 158.7 g of water was furthermore prepared. 10 g of $H_3PO_4$ with 100 g of water were then initially introduced into a reaction vessel and neutralized to a pH of 7 with the basic solution to give the initial charge solution (II). 100 g of the phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 9

A phosphoric acid solution (I) was prepared from 80 g of 75% strength $H_3PO_4$ and 160 g of deionized water. 14.4 g of $Co_3O_4$ and 3.5 g of Fe were added to this solution (I). Solution (I) was stirred at room temperature for 60 minutes and then filtered in order to remove any remaining residues from the solution.

A basic solution of 41.9 g of NaOH and 376.8 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 10

A phosphoric acid solution (I) was prepared from 80 g of 75% strength $H_3PO_4$ and 160 g of deionized water. 14.3 g of $Mn_3O_4$ and 3.5 g of Fe were added to this solution (I). Solution (I) was stirred at room temperature for 90 minutes and 17.7 g of $CoSO_4.6H_2O$, dissolved in 20 g of water, were then added. The resulting solution was then filtered in order to remove any remaining residues.

A basic solution of 40 g of NaOH and 1,000 g of water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 11

A phosphoric acid solution (I) was prepared from 80 g of 75% strength $H_3PO_4$ and 160 g of deionized water. 14.3 g of $Mn_3O_4$ and 3.5 g of Fe were added to this solution (I). Solution (I) was stirred at 60° C. for 90 minutes and 2.6 g of $Mg(acetate)_2.6H_2O$, dissolved in 20 g of water, were then added. The resulting solution was then filtered in order to remove any remaining residues.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 12

A phosphoric acid solution (I) was prepared from 80 g of 75% strength $H_3PO_4$ and 160 g of deionized water. 14.3 g of $Mn_3O_4$ and 2.2 g of Fe as well as 1.5 g of Co were added to this solution (I). Solution (I) was stirred at room temperature for 90 minutes and then filtered in order to remove any remaining residues from the solution.

A basic solution of 40 g of NaOH and 1,000 g of deionized water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was divided and in each case one part was dried at 60° C. or, respectively, 120° C. in a circulating air drying cabinet.

Example 13

A phosphoric acid solution (I) was prepared from 80 g of 75% strength $H_3PO_4$ and 160 g of deionized water. 14.3 g of $Mn_3O_4$ and 2.2 g of Fe as well as 1.5 g of Co were added to this solution (I). Solution (I) was stirred at room temperature for 90 minutes and then filtered in order to remove any remaining residues from the solution. 2.6 g of $Mg(acetate)_2.6H_2O$, dissolved in 20 g of water, were then added to this solution.

A basic solution of 40 g of NaOH and 1,000 g of deionized water was furthermore prepared. 25 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was divided and in each case one part was dried at 60° C. or, respectively, 120° C. in a circulating air drying cabinet.

Example 14

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 1.94 g of $Al_2(SO_4)_3.18H_2O$, dissolved in 20 ml of water, were then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 15

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 0.65 g of $CuCO_3.Cu(OH)_2.0.5H_2O$, dissolved in 20 ml of dilute HCl, were then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 16

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 1.09 g of $LaCl_3.7H_2O$, dissolved in 20 ml of water, were then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 17

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 1.12 g of $EuCl_3.7H_2O$, dissolved in 20 ml of water, were then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 18

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 0.66 g of $SnCl_2.2H_2O$, dissolved in 20 ml of dilute HCl, were then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 19

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 0.95 g of $ZrOCl_2$, dissolved in 20 ml of dilute HCl, was then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Example 20

A phosphoric acid solution (I) was prepared from 1,090 g of 75% strength $H_3PO_4$ and 2,380 g of deionized water. 209 g of $Mn_3O_4$ and 51 g of Fe were added to this solution (I). Solution (I) was stirred at room temperature for 90 minutes and 0.33 g of $CaCl_2$, dissolved in 20 ml of dilute HCl, was then added to 100 g of this solution to give the solution and the solution was filtered in order to remove any remaining residues from the solution.

A basic solution of 50 g of NaOH and 450 g of water was furthermore prepared. 10 g of $H_3PO_4$ with 100 g of water were then initially introduced into a reaction vessel and neutralized to a pH of 7 with the basic solution to give the initial charge solution (II). The phosphoric acid $Me^{2+}$ solution (I) and the basic solution were metered simultaneously into the neutralized initial charge solution (II), while stirring, such that the pH of the initial charge solution (II) was always kept between 6.5 and 7. When the metering in had ended, the solution was stirred for a further 5 minutes. The solid precipitated was then filtered off with suction with the aid of a suction filter and washed with deionized water. The filter cake was dried at 80° C. in a circulating air drying cabinet.

Table 1 summarizes Examples 1 to 20 and the results of the analytical studies on the particular products.

The examples show that nutrients according to the invention with monometallic or multimetallic phosphates having the water of crystallization content according to the invention and a ratio of metal to phosphate ($PO_4$) of about 3 to 2 are obtained. Where present, the metals Fe, Mn, Ni and Co are thus present in the products in their divalent form. It is conceivable that very small amounts of these metals are present in a different oxidation state, for example Fe can oxidize on the particle surfaces to a small extent, e.g. during drying and at high temperatures. Such slight deviations from the divalent form are to be regarded as unavoidable impurities in the context of the present invention, as a result of which they do not go beyond the scope of protection of the invention. The doping metals can be present in the form of their stable and known oxidation states.

In the x-ray diffraction analysis, the products of Examples 1 to 20 could all be assigned either to the vivianite crystal structure type [$Fe_3(PO_4)_2.8H_2O$] or dehydration levels thereof or a crystal structure type not hitherto described, which herein is called [$Mn_3(PO_4)_2.3H_2O$] crystal structure type.

The drying temperature had an influence on the content of bonded water of crystallization. The higher the drying temperature and the longer the duration of the drying, the lower the water of crystallization content. A reduced water partial pressure accelerated the drying.

Figure 1:
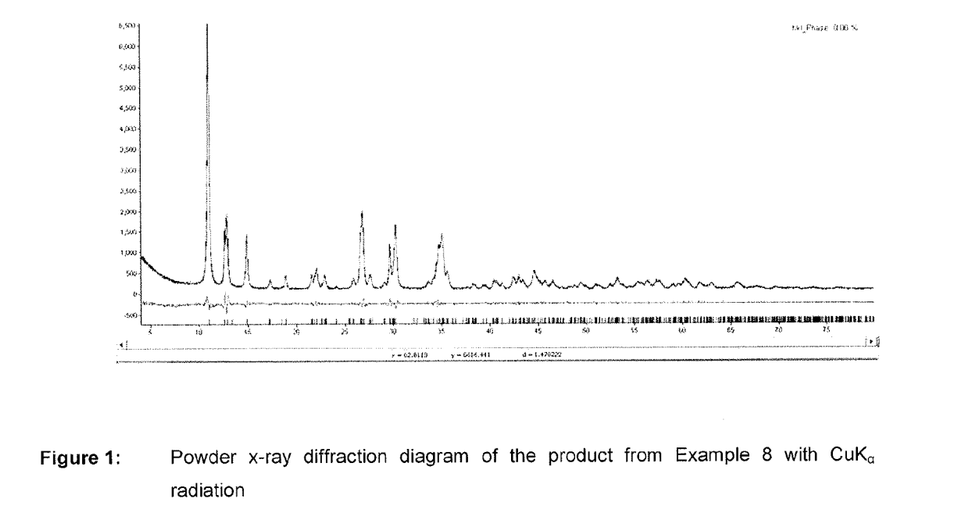
FIG. 1: Powder x-ray diffraction diagram of the product from Example 8 with $CuK_\alpha$ radiation.
Figure 2:
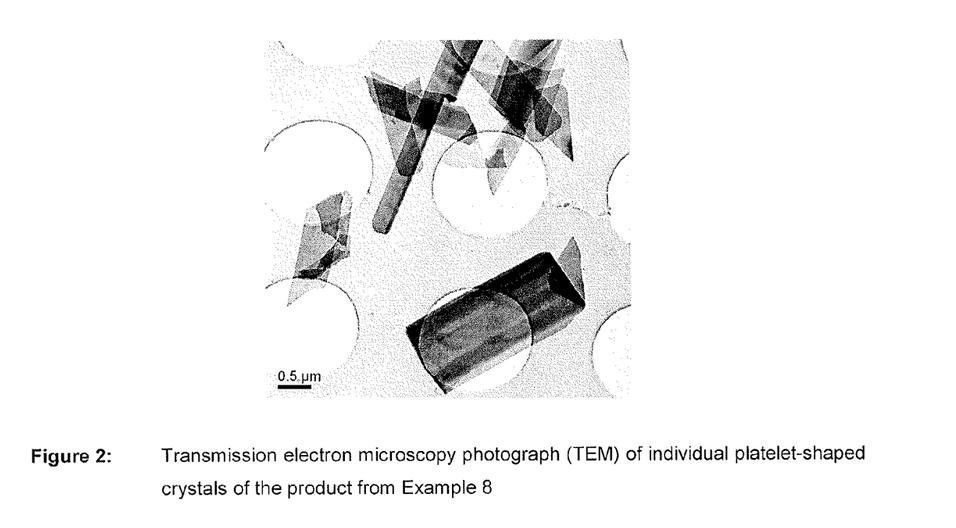
FIG. 2: Transmission electron microscopy photograph (TEM) of individual platelet-shaped crystals of the product from Example 8.
Figure 3:
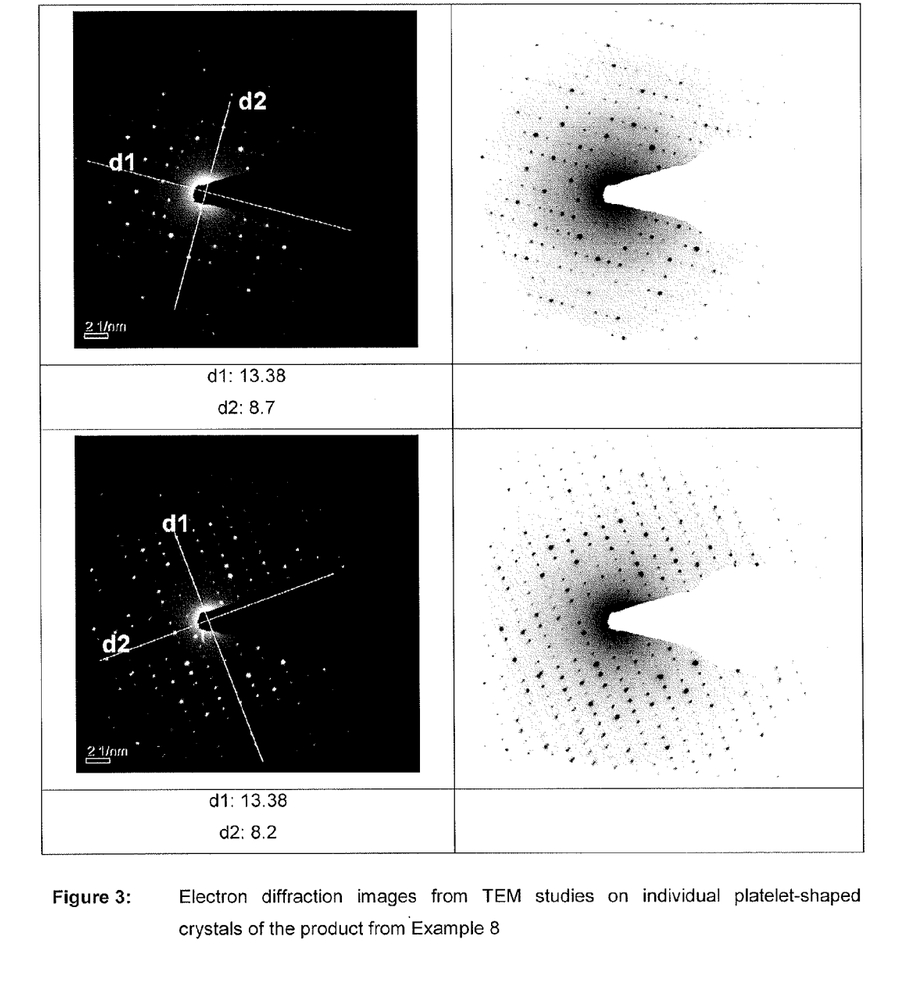
FIG. 3: Electron diffraction images from TEM studies on individual platelet-shaped crystals of the product from Example 8.
Figure 4:
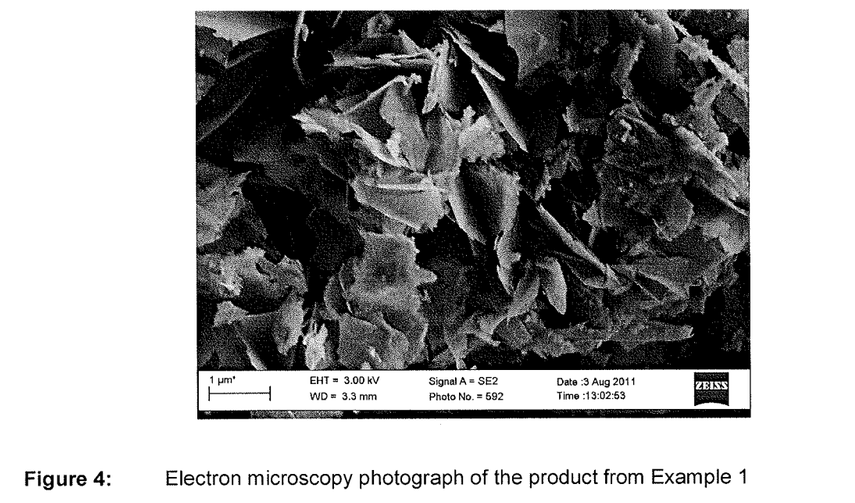
FIG. 4: Electron microscopy photograph of the product from Example 1.
Figure 5:
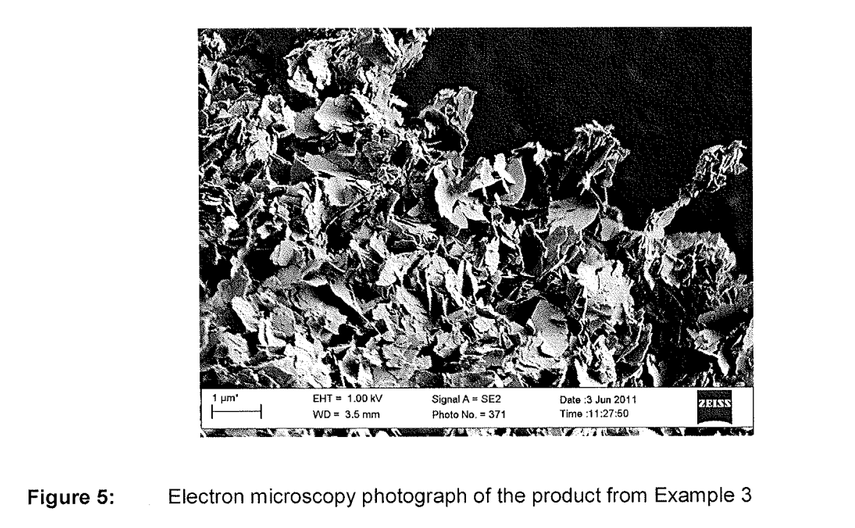
FIG. 5: Electron microscopy photograph of the product from Example 3.
Figure 6:
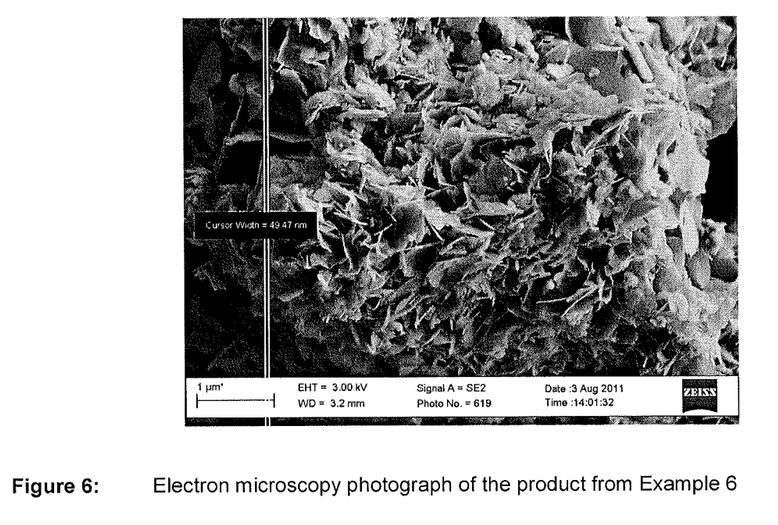
FIG. 6: Electron microscopy photograph of the product from Example 6.
Figure 7:
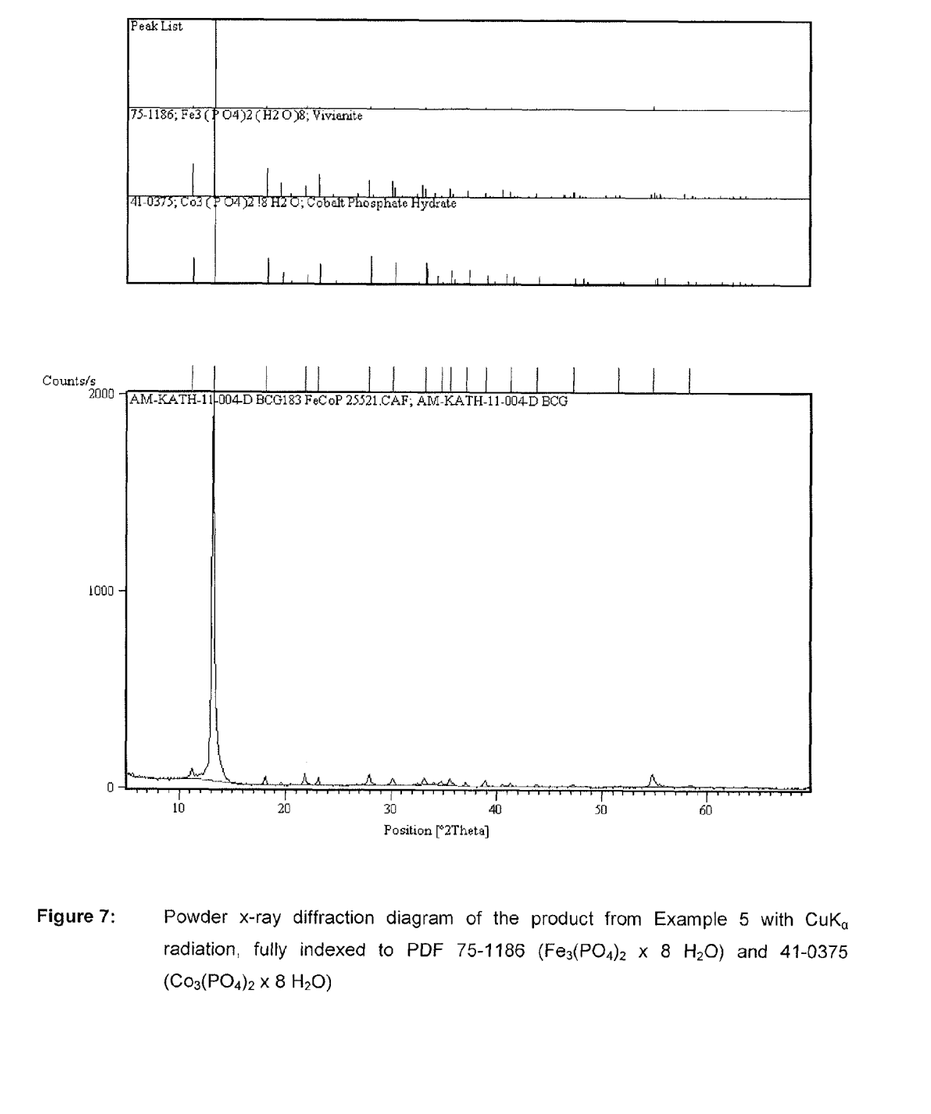
FIG. 7: Powder x-ray diffraction diagram of the product from Example 5 with $CuK_\alpha$ radiation, fully indexed to PDF 75-1186 ($Fe_3(PO_4)_2 \times 8\ H_2O$) and 41-0375 ($Co_3(PO_4)_2 \times 8H_2O$)
Figure 8:
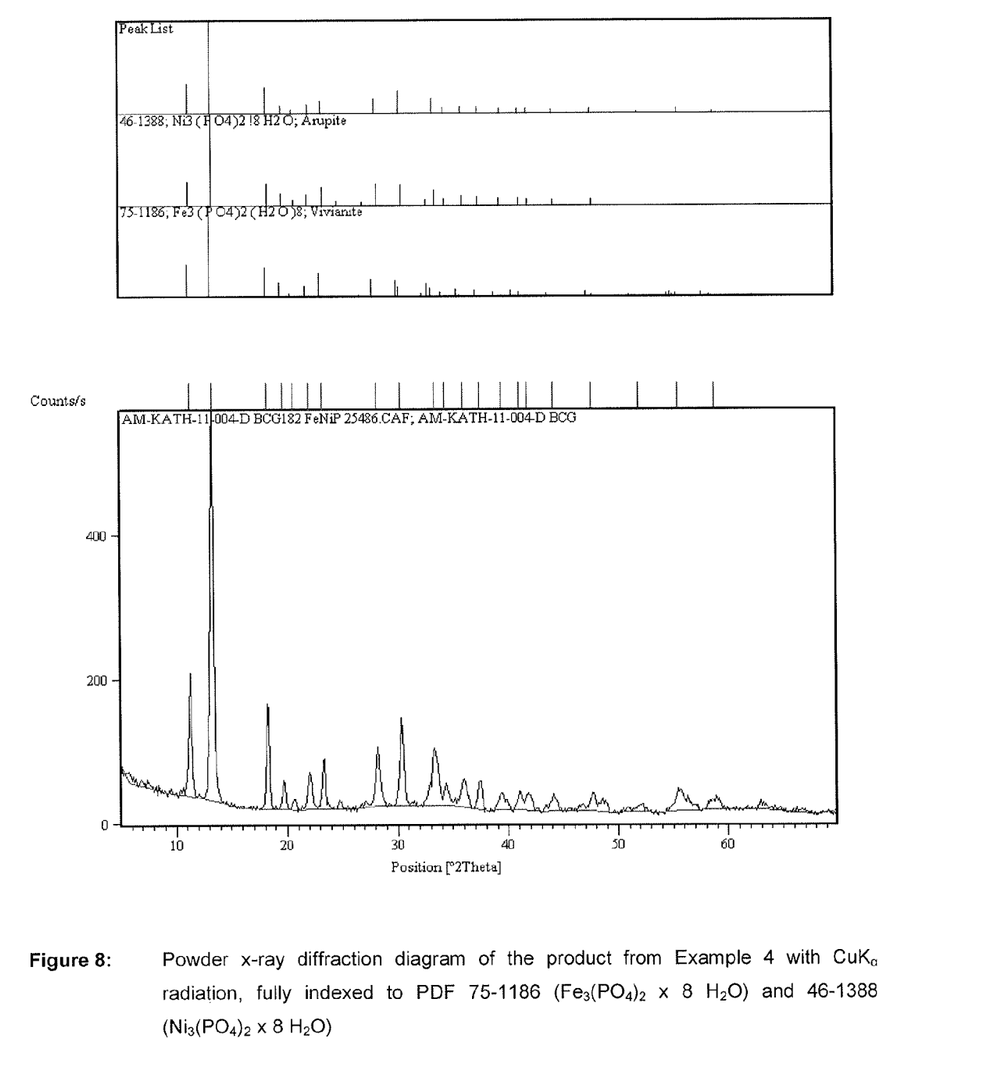
FIG. 8: Powder x-ray diffraction diagram of the product from Example 4 with $CuK_\alpha$ radiation, fully indexed to PDF 75-1186 ($Fe_3(PO_4)_2 \times 8\ H_2O$) and 46-1388 ($Ni_3(PO_4)_2 \times 8\ H_2O$).

In powder x-ray analyses and in electron diffraction analyses in a transmission electron microscope, the products of Examples 1, 2, 3, 8 and 10 to 20 showed diffractograms which demonstrate an orthorhombic unit cell with axis lengths of 13.3+/−0.2, 8.6+/−0.2 and 8.1+/−0.2 Ångström. This unit cell having the parameters which are mentioned and which vary slightly within the stated ranges according to the composition of the metal components was not known hitherto in the relevant databanks for compounds of the composition $Mn_3(PO_4)_2.3H_2O$ and (pseudo)binary, (pseudo)ternary or (pseudo)quaternary variants thereof. The structure is observed if the product according to the invention comprises exclusively Mn as the metal (see Example 9), but also if further metals are present. The results of the examples merely suggest that a manganese content of at least about 55%, based on all the metals present, is required or sufficient to form the [$Mn_3(PO_4)_2.3H_2O$] crystal structure type described. However, it cannot be ruled out that cation ratios other than those investigated in the examples may also lead to the formation of this structure type.

The products with the [$Mn_3(PO_4)_2.3H_2O$] crystal structure type stated herein all show the same analytical x-ray diffraction diagram, and only the peak positions show slight shifts, depending on the nature and concentration of the various metals, which are caused by different ionic radii and a varying degree of occupation of the cation places in the crystal lattice of the unit cell.

For a compound of the type $Mn_3(PO_4)_2.3H_2O$ there is a PDF entry (powder diffraction file) under number 003-0426 in the databank of the ICDD (International Centre for Diffraction Data), but between the data filed there and the values determined experimentally here for the products according to the invention of the [Mn₃(PO₄)₂.3H₂O] crystal structure type there are no agreements with respect to position, number and intensity of the reflexes described. Furthermore, no crystallographic data which describe the crystal structure in more detail are filed for the compound described in the ICDD databank. The products according to the invention of the [Mn₃(PO₄)₂.3H₂O] crystal structure type stated herein have thus not hitherto been described.

The products according to the invention have predominantly a platelet-shaped morphology of the primary crystallites, where the platelet thickness in the scanning electron microscope can be determined in an order of magnitude of from about 30 to 50 nm, in some cases also <30 nm. In products having a high nickel content (Examples 4 and 5), spherical primary crystallites can also be found.

The platelet-shaped morphology of the products prepared in principle allows a dense packing of the crystallites, i.e. the platelets can stack with a lower exclusion volume than is the case with round spherical particles. Aggregates or agglomerates of this material built up in the form of layers can easily be converted into dispersions of the primary particles by the usual methods under the action of shearing forces.

wherein the phosphate has predominantly a platelet-shaped morphology of the primary crystallites, and
wherein the phosphate is prepared by:
a) preparing an aqueous solution (I) which comprises two or more of the metals Mn, Fe, Co or Ni as divalent cations by introducing oxidic metal(II), metal(III) or metal(IV) compounds or mixtures or compounds thereof having mixed oxidation states, selected from the group consisting of hydroxides, oxides, oxide hydroxides, oxide hydrates, carbonates and hydroxide carbonates, of at least one of the metals Mn, Fe, Co or Ni together with the elemental forms or alloys of at least one of the metals Mn, Fe, Co or Ni into an aqueous medium comprising phosphoric acid and reacting the oxidic metal compounds with the elemental forms or alloys of the metals (in a redox reaction) to give the divalent metal ions,
b) separating off any solids present from the phosphoric acid aqueous solution (I),
c) if the phosphate is a mixed metallic phosphate and, in addition to the metals introduced into the solution in stage a), comprises further metals selected from (M1,

TABLE 1

| | Elemental metals, oxidic metal compounds and salts employed | | | | Analytical results | | | | | |
|---|---|---|---|---|---|---|---|---|---|---|
| Ex. | M1 | M2 | M3 | M4 | T* | M1 [wt. %] | M2 [wt. %] | M3 [wt. %] | M4 [wt. %] | Crystal structure | Morphology |
| 1 | Fe | Mn₃O₄ | — | — | 120 | 24.4 | 75.6 | — | — | Mn₃(PO₄)₂ · 3 H₂O | platelet |
| 2 | Fe | MnO₂ | Mn₃O₄ | — | 120 | 31.8 | 68.2 | — | — | Mn₃(PO₄)₂ · 3 H₂O | platelet |
| 3 | Co | Mn₃O₄ | — | — | 70 | 37.3 | 62.7 | — | — | Mn₃(PO₄)₂ · 3 H₂O | platelet |
| 4 | Fe | Fe₃O₄ | NiSO₄ | — | 100 | 39.2 | — | 60.8 | — | vivianite type | platelet + spherical |
| 5 | Co | Fe₃O₄ | — | — | 70 | 25.7 | 74.3 | — | — | vivianite type | platelet |
| 6 | Co | Co₃O₄ | — | — | 80 | 100.0 | --- | — | — | vivianite type | platelet |
| 7 | Fe | Fe₃O₄ | — | — | 80 | 100.0 | --- | — | — | vivianite type | platelet |
| 8 | Mn | Mn₃O₄ | — | — | 80 | 100.0 | --- | — | — | Mn₃(PO₄)₂ · 3 H₂O | platelet |
| 9 | Fe | Co₃O₄ | — | — | 80 | 11.2 | 88.8 | — | — | vivianite type | platelet |
| 10 | Fe | Mn₃O₄ | CoSO₄ | — | 80 | 19.4 | 58.2 | 22.4 | — | Mn₃(PO₄)₂ · 3 H₂O | platelet |
| 11 | Fe | Mn₃O₄ | MgOAc₂ | — | 80 | 25.2 | 72.9 | 1.8 | — | Mn₃(PO₄)₂ · 3 H₂O | platelet |
| 12 | Fe | Co | Mn₃O₄ | — | 80 | 14.6 | 12.4 | 73.0 | — | Mn₃(PO₄)₂ · 3 H₂O | n.d. |
| 13 | Fe | Co | Mn₃O₄ | MgOAc₂ | 80 | 13.7 | 12.4 | 73.0 | 1.0 | Mn₃(PO₄)₂ · 3 H₂O | n.d. |
| 14 | Fe | Mn₃O₄ | Al₂(SO₄)₃ | — | 80 | 24.6 | 72.7 | 27 | — | Mn₃(PO₄)₂ · 3 H₂O | n.d. |
| 15 | Fe | Mn₃O₄ | CuCO₃ . Cu(OH)₂ | — | 80 | 24.3 | 70.8 | 5.0 | — | Mn₃(PO₄)₂ · 3 H₂O | n.d. |
| 16 | Fe | Mn₃O₄ | LaCl₃ | — | 80 | 23.8 | 68.1 | 8.1 | — | Mn₃(PO₄)₂ · 3 H₂O | n.d. |
| 17 | Fe | Mn₃O₄ | EuCl₃ | — | 80 | 23.6 | 69.5 | 6.9 | — | Mn₃(PO₄)₂ · 3 H₂O | n.d. |
| 18 | Fe | Mn₃O₄ | SnCl₂ | — | 80 | 24.0 | 70.2 | 5.8 | — | Mn₃(PO₄)₂ · 3 H₂O | n.d. |
| 19 | Fe | Mn₃O₄ | ZrOCl₂ | — | 80 | 24.2 | 70.6 | 5.2 | — | Mn₃(PO₄)₂ · 3 H₂O | n.d. |
| 20 | Fe | Mn₃O₄ | CaCl₂ | — | 80 | 25.1 | 73.0 | 1.9 | — | Mn₃(PO₄)₂ · 3 H₂O | n.d. |

- T* = drying temperature; "vac" = vacuum;
- M1, M2, M3 and M4 under "Analytical results" = wt.% of the metal introduced, based on the total amount of the metals introduced (--- = for the same metals content of the metal already stated in the preceding column)

The invention claimed is:

1. A nutrient composition for biological systems, such as humans, animals, plants and microorganisms, comprising a mixed metallic phosphate of the general formula (I):

(M1M2M3 . . . Mx)₃(PO₄)₂.$a$H₂O    (I)

wherein 0≤$a$≤9 and (M1, M2, M3 . . . Mx) represents metal cations of the phosphate, wherein two or more of the metal cations are divalent metal cations, and wherein M1 represents a first metal and M2, M3 . . . Mx represent any additional metals of the mixed metallic phosphate, each of M1, M2, M3 . . . Mx present in the phosphate is selected from the group consisting of Na, K, Mg, Ca, Cr, Mo, W, Mn, Fe, Co, Ni, Cu, Zn and B, with the proviso that at least one of M1, M2, M3 . . . Mx is selected from the group consisting of Mn, Fe, Co and Ni, M2, M3 . . . Mx), furthermore adding to the aqueous solution (I) at least one compound of at least one of the metals (M1, M2, M3 . . . Mx) in the form of an aqueous solution or as a solid in the form of a salt, d) providing an initial charge solution (II) having a pH of from 5 to 8 prepared from an aqueous phosphoric acid solution by neutralization with an aqueous alkali metal hydroxide solution or prepared from an aqueous solution of one or more alkali metal phosphates, e) metering the aqueous solution (I) into the initial charge solution (II) and simultaneously metering in a basic aqueous alkali metal hydroxide solution such that the pH of the reaction mixture obtained is kept in the range of from 5 to 8, the compound of the general formula (I) being precipitated, f) separating off from the reaction solution the phosphate which has precipitated.

2. The nutrient composition according to claim 1, wherein the phosphate, which has been precipitated and separated off from the reaction solution, is dried down to a hydrate level, where 0≤a≤8 in the general formula (I).

3. The nutrient composition according to claim 1, wherein the phosphate is a mixed metallic phosphate which comprises at least 3 different metals (M1 M2 M3 . . . Mx).

4. The nutrient composition according to claim 1, wherein the precipitation of the phosphate of the general formula (I) in stage e) is carried out at a temperature in the range of from 5 to 105° C.

5. The nutrient composition according to claim 1, wherein the initial charge solution (II) comprises the phosphate ions, calculated as $P_2O_5$, in a concentration in the range of from 0.35 to 1.85 mol/l.

6. The nutrient composition according to claim 1, wherein the phosphate of the general formula (I) comprises manganese (Mn) and, in the powder x-ray diffraction diagram, has peaks at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degree two-theta, based on CuKα radiation.

7. The nutrient composition according to claim 1, wherein the phosphate of the general formula (I) comprises manganese (Mn) and has an orthorhombic unit cell having lattice parameters of 13.2±0.2, 8.6±0.2 and 8.1±0.2 Angstrom.

8. The nutrient composition according to claim 1, wherein the aqueous medium comprising phosphoric acid for the preparation of the aqueous solution (I) comprises the phosphoric acid in a molar excess with respect to the sum of the molar amounts of the metal cations, which are to be introduced into the solution, of the oxidic metal compounds and the metals to be introduced in elemental form or as an alloy.

9. The nutrient composition according to claim 1, wherein the reaction of the oxidic metal compounds with the elemental forms or alloys of the metals in stage a) is carried out according to at least one of the following conditions: at a temperature in the range of from 5° C. to 105° C. or with intensive thorough mixing or for a period of time from 1 min to 240 min.

10. The nutrient composition according to claim 1, wherein the concentration of the phosphoric acid in the aqueous solution (I) is 5% to 85% based on the weight of the aqueous solution (I).

11. The nutrient composition according to claim 1, wherein the at least one compound added in step c) is selected from the group consisting of hydroxides, oxides, oxide hydroxides, oxide hydrates, carbonates, hydroxide carbonates, carboxylates, sulphates, chlorides, and nitrates of the metals.

12. The nutrient composition according to claim 2, wherein the phosphate is dried down to a hydrate level where 0≤a≤3 in the general formula (I).

13. The nutrient composition according to claim 3, wherein the phosphate is a mixed metallic phosphate which comprises at least 10 different metals (M1 M2 M3 . . . Mx).

14. A nutrient composition for biological systems, such as humans, animals, plants and microorganisms, comprising an aqueous solution (I) which comprises cations of divalent metals (M1, M2, M3 . . . Mx),
wherein the metals (M1, M2, M3 . . . Mx) in the aqueous solution comprise two or more divalent metals and the metals (M1, M2, M3 . . . Mx) are selected from the group consisting of Na, K, Mg, Ca, Cr, Mo, W, Mn, Fe, Co, Ni, Cu, Zn and B, with the proviso that at least one of the metals is selected from the group consisting of Mn, Fe, Co and Ni,
wherein the aqueous solution (I) is prepared by:
introducing oxidic metal(II), metal(III) or metal(IV) compounds or mixtures or compounds thereof having mixed oxidation states, selected from the group consisting of hydroxides, oxides, oxide hydroxides, oxide hydrates, carbonates and hydroxide carbonates, of at least one of the metals Mn, Fe, Co or Ni together with the elemental forms or alloys of at least one of the metals Mn, Fe, Co or Ni into an aqueous medium comprising phosphoric acid and reacting the oxidic metal compounds with the elemental forms or alloys of the metals (in a redox reaction) to give the divalent metal ions, and
optionally adding to the aqueous solution (I) at least one compound of at least one of the metals (M1, M2, M3 . . . Mx) in the form of an aqueous solution or as a solid in the form of a salt.

15. The nutrient composition according to claim 14, wherein solution (I) comprises at least 3 different metals (M1 M2 M3 . . . Mx).

16. The nutrient composition according to claim 15, wherein the phosphate is a mixed metallic phosphate which comprises at least 10 different metals (M1 M2 M3 . . . Mx).

17. The nutrient composition according to claim 14, wherein the at least one compound added to the aqueous solution (I) is selected from the group consisting of hydroxides, oxides, oxide hydroxides, oxide hydrates, carbonates, hydroxide carbonates, carboxylates, sulphates, chlorides, and nitrates of the metals.

18. A method of preparing a nutrient composition comprising a phosphate of the general formula (I):

$$(M1M2M3 \ldots Mx)_3(PO_4)_2 \cdot aH_2O \qquad (I)$$

wherein 0≤a≤9 and (M1, M2, M3 . . . Mx) represents one or more metal cations of the phosphate, wherein where the phosphate is a monometallic phosphate M2, M3 . . . Mx are not present and where the metallic phosphate is a mixed metallic phosphate M1 represents a first metal and M2, M3 . . . Mx represent any additional metals of the mixed metallic phosphate, each of M1, M2, M3 . . . Mx present in the phosphate is selected from the group consisting of Na, K, Mg, Ca, Cr, Mo, W, Mn, Fe, Co, Ni, Cu, Zn and B, with the proviso that at least one of M1, M2, M3 . . . Mx is selected from the group consisting of Mn, Fe, Co and Ni, comprising the steps of:

a) preparing an aqueous solution (I) which comprises one or more of the metals Mn, Fe, Co or Ni as divalent cations by introducing oxidic metal(II), metal(III) or metal(IV) compounds or mixtures or compounds thereof having mixed oxidation states, selected from the group consisting of hydroxides, oxides, oxide hydroxides, oxide hydrates, carbonates and hydroxide carbonates, of at least one of the metals Mn, Fe, Co or Ni together with the elemental forms or alloys of at least one of the metals Mn, Fe, Co or Ni into an aqueous medium comprising phosphoric acid and reacting the oxidic metal compounds with the elemental forms or alloys of the metals (in a redox reaction) to give the divalent metal ions;

b) separating off any solids present from the phosphoric acid aqueous solution (I);

c) if the phosphate is a mixed metallic phosphate and, in addition to the metals introduced into the solution in stage a), comprises further metals selected from (M1, M2, M3 . . . Mx), furthermore adding to the aqueous solution (I) at least one compound of at least one of the metals (M1, M2, M3 . . . Mx) in the form of an aqueous solution or as a solid in the form of a salt;

d) providing an initial charge solution (II) having a pH of from 5 to 8 prepared from an aqueous phosphoric acid solution by neutralization with an aqueous alkali metal hydroxide solution or prepared from an aqueous solution of one or more alkali metal phosphates;

e) metering the aqueous solution (I) into the initial charge solution (II) and simultaneously metering in a basic aqueous alkali metal hydroxide solution such that the pH of the reaction mixture obtained is kept in the range of from 5 to 8, the compound of the general formula (I) being precipitated; and f) separating off from the reaction solution the phosphate which has precipitated.

19. The method according to claim 18, wherein the at least one compound added in step c) is selected from the group consisting of hydroxides, oxides, oxide hydroxides, oxide hydrates, carbonates, hydroxide carbonates, carboxylates, sulphates, chlorides, and nitrates of the metals.

\* \* \* \* \*